No. 730,077. PATENTED JUNE 2, 1903.
J. I. & C. V. ARBOGAST.
ART OF MANUFACTURING ARTICLES OF GLASS.
APPLICATION FILED AUG. 27, 1902.
NO MODEL.
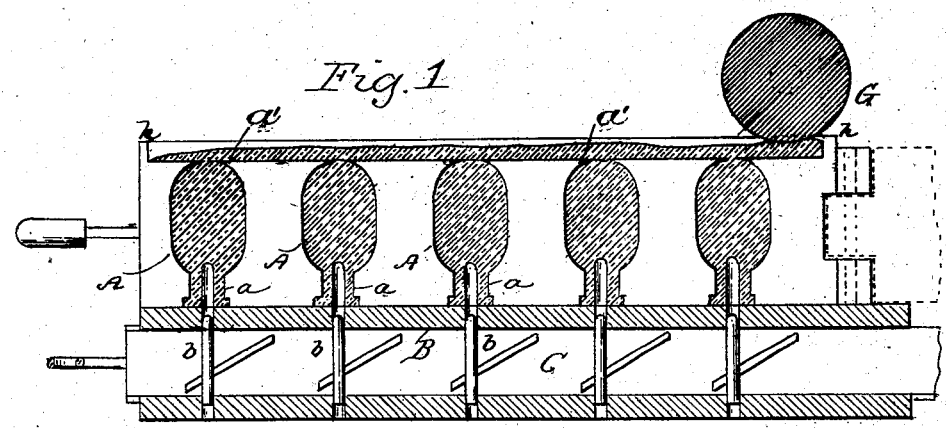
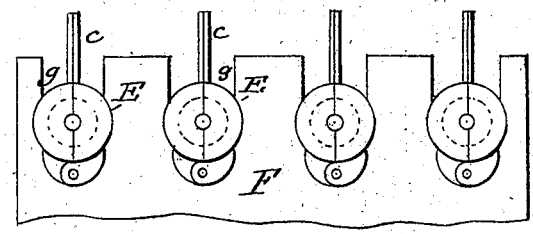
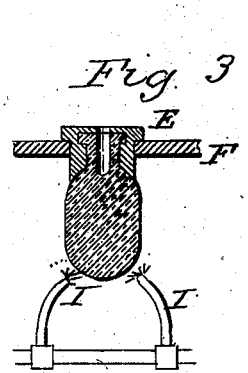
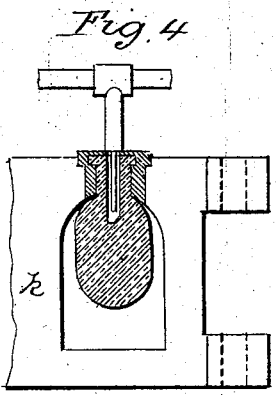
WITNESSES
INVENTORS
John I. Arbogast
Charles V. Arbogast
By Connolly Bros Attorneys No. 730,077. Patented June 2, 1903.

UNITED STATES PATENT OFFICE.

JOHN I. ARBOGAST AND CHARLES V. ARBOGAST, OF PITTSBURG, PENNSYLVANIA.

ART OF MANUFACTURING ARTICLES OF GLASS.

SPECIFICATION forming part of Letters Patent No. 730,077, dated June 2, 1903.

Application filed August 27, 1902. Serial No. 121,198. (No specimens.)

*To all whom it may concern:*

Be it known that we, JOHN I. ARBOGAST and CHARLES V. ARBOGAST, citizens of the United States, residing at Pittsburg, in the county of Allegheny and State of Pennsylvania, have invented certain new and useful Improvements in the Art of Manufacturing Articles of Glass; and we do hereby declare the following to be a full, clear, and exact description of the invention, such as will enable others skilled in the art to which it appertains to make and use the same.

This invention has relation to the manufacture of hollow glassware, and has for its object the provision of a novel method or process whereby the skill and experience now required in the production of hollow glassware is dispensed with, the cost of production greatly lessened, and the output of the factory greatly increased.

In making hollow glassware—such, for example, as bottles—it is customary, in accordance with the practice of many years, to first blow the body of the article in a mold, then attach it in a reversed position to a punty, then reheat and shape the neck, and finally anneal the finished article. The operations of blowing the article and then finishing the neck require skilled high-priced labor. But one article is handled at a time, and all the operations are necessarily carried on in the furnace-room of the factory, wherein are located the melting and reheating furnaces and the other necessary appliances.

Our object is to obviate the difficulties heretofore experienced in the endeavors to produce hollow articles of glassware in quantity and without employing skilled labor, and with this object in view we propose, first, to produce at one operation and in a single mold a number of blanks, of which the neck part only will be finished; second, to reheat at one operation a number of the partly-finished blanks and to then blow the articles in molds to the complete form of the finished articles; thirdly, to anneal the articles so produced.

The gist of our present invention lies in the molding at one time and in a single mold several blanks having only the neck part finished and then reheating and subsequently blowing the blanks to completed form. As the bodies of the articles are not blown until the neck parts are completed, there is no danger attending the reheating according to our method, and such reheating and subsequent blowing may be conducted by unskilled labor at a cost greatly less than now necessary in blowing single articles in molds. It is our purpose in blowing the reheated articles to shape to use compressed air, and thus substitute mechanical appliances for skilled labor.

In carrying our invention into effect we employ a mold for the formation of the blanks with neck parts with a number of cavities, so that a number of blanks can be made at one time, and we fill these cavities either by pressing, as by the use of a plunger, or by rolling—that is, by pouring the glass on a plate having openings leading to the mold-cavities and passing over the glass a roller which will force the glass into the cavities.

In the accompanying drawings, illustrating apparatus for carrying our invention into effect, Figure 1 is a sectional view of a mold adapted for the first step of the process. Fig. 2 is a plan view of the reheating apparatus. Fig. 3 is a sectional view of the same, and Fig. 4 is a sectional view of a blow-mold adapted for the formation of the article by blowing.

The mold shown in Fig. 1 is intended for forming at one time a number of blanks and consists of a hinged two-part mold having several cavities A A, with extensions $a\ a$ at their bottoms cut to form the necks of the blanks. Each of the cavities A is formed with a sprue $a'$, through which the molten glass is forced into the cavity. The base-plate B is pierced below each cavity for the passage of a plug $b$, and these plugs are supported by a sliding wedge-plate C, which in one position allows all the plugs to sink below the surface of the plate B, but which when drawn lengthwise elevates the plugs into the neck-forming portions of the mold-cavities. The mold being closed, the molten glass is forced into each cavity through the sprue a' in the top of the mold, preferably by means of a roller G, and over the plugs, so as to form the neck-openings and a small cavity in the ball of glass above the neck. The plugs are now withdrawn, the mold is then opened, and the blanks are removed and severed from the mass of rolled glass and blown into shape, after which they are removed to the leer and annealed. After being pressed or rolled into the mold for forming the necks and severed from the mass of rolled glass the blanks are ready for the reheating and finishing operations, and these are conducted in the following manner: The blanks are each inserted, with the neck part uppermost, in a suitable holder, which may consist of a two-part hinged ring E, having extensions c to form a handle, and the holders or rings are arranged on a supporting plate or table F, provided with any number of openings g g, so that the bulb part of the blanks will hang downward through the openings g g. Gas-jets I I are arranged below the plate or table F in such positions that the flames will play upon the blanks and reheat the bulbs to a sufficient extent for blowing. The rings E E, with the blanks supported thereby, are then removed from the reheating apparatus and placed on a suitable blow-mold k, having cavities of the shape to which the blanks are to be blown, and the unfinished parts of the blanks are then blown, preferably by compressed air, so as to fill the cavities of the mold and complete the articles, after which they are annealed.

The mold k may be formed with a number of cavities, all connected or communicating with a single compressed-air pipe, so that a number of articles may be finished at the same time and in one operation.

In using the mold k the rings or blank-holders E rest on the top of the mold and form caps to the mold-cavities. These holders may be shaped on their under sides to correspond with the shoulder part of the article to be made. As our present invention does not relate specially to the structural features of the molds or other appliances, we do not deem it necessary to give a more specific description of the same, as it is within the scope and purpose of our invention to use any of the available appliances now employed in glass-factories. Inasmuch, however, as we have referred to the use of a roller for pressing or rolling the glass into the cavities of the mold for forming the necks, we will briefly describe a mold adapted for use with such a roller. Such mold is provided with a flanged upper surface, forming a table, upon which the molten glass is poured from a ladle, the flanges or guides h h preventing the glass from flowing over the sides and ends of the mold. The glass is forced into the openings in the top of the mold by a roller G, which is passed over the glass. The flanges or guides h h serve as guides for the roller as well as guards to prevent the overflow of the glass. In some instances a separate perforated plate may be used on the top of the mold, and then it will be only necessary to raise the plate after the cavities are filled to break the blanks from the surplus glass above the plate.

The advantages of the process described will be easily understood and appreciated. As the preliminary work consists in simultaneously forming a number of blanks in a press or roller-mold without blowing and the final work consists in simply blowing the blanks to completed shape in properly-constructed molds, no skill is required beyond that easily acquired by the gathering boys and mold attendants. The blanks do not have to be rolled, kneaded, or submitted to any of the usual operations, and hence a large number of blanks may be produced simultaneously. After the blanks formed in the first mold have been reheated the subsequent finishing may be performed by unskilled labor and under such conditions that a large number of blanks may be blown to complete shape at one time.

In lieu of the mold described for forming the blanks any other suitable mold may be employed—as, for instance, a mold embodying the features shown in Letters Patent to Philip Arbogast, No. 260,891, granted July 11, 1882, in which the neck of the blank is formed at the top of the mold with the unfinished portion of the blank below.

Having described our invention, what we claim, and desire to secure by Letters Patent, is—

1. The method of forming a hollow blank for the manufacture of glassware, consisting in rolling a mass of molten glass through a sprue into a suitable mold-cavity and then severing the blank from the mass of rolled glass.

2. The method of manufacturing glassware, consisting in rolling a mass of molten glass and thereby forcing part of it through a sprue into a suitable mold-cavity, then severing the molded glass from the rolled mass and then finishing the article.

3. The method of manufacturing glassware, consisting in rolling a mass of molten glass through a sprue into a suitable mold-cavity, then severing the molded glass from the rolled mass and then blowing the article to the desired shape.

4. The method of forming hollow glassware consisting in rolling a mass of molten glass and thereby forcing a part of the same through a sprue into a mold-cavity and over a plug sustained therein, then withdrawing the plug, leaving a cavity in the glass, then separating the molded blank from the rolled mass and finally blowing the blank to finished form.

5. The method of simultaneously forming a number of blanks for the manufacture of glassware, consisting in rolling a mass of molten glass and thereby forcing a portion of it through a plurality of sprues into an equal number of mold-cavities and then separating the molded blanks from the remainder of the mass.

In testimony whereof we affix our signatures in presence of two witnesses.

JOHN I. ARBOGAST.
CHARLES V. ARBOGAST.

Witnesses:
ANTHONY A. CONNOLLY,
WM. D. HADGER.